(12) United States Patent
Ye et al.

(10) Patent No.: US 12,306,484 B2
(45) Date of Patent: May 20, 2025

(54) PRIVACY FILM AND DISPLAY DEVICE

(71) Applicant: WUHAN CHINA STAR OPTOELECTRONICS TECHNOLOGY CO., LTD., Hubei (CN)

(72) Inventors: Wenlong Ye, Hubei (CN); Wei Cheng, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/758,229

(22) PCT Filed: Jun. 2, 2022

(86) PCT No.: PCT/CN2022/096921
§ 371 (c)(1),
(2) Date: Jun. 30, 2022

(87) PCT Pub. No.: WO2023/221190
PCT Pub. Date: Nov. 23, 2023

(65) Prior Publication Data
US 2024/0201527 A1 Jun. 20, 2024

(30) Foreign Application Priority Data
May 20, 2022 (CN) .......................... 202210556455.6

(51) Int. Cl.
G02F 1/13 (2006.01)
G02F 1/1334 (2006.01)
(Continued)

(52) U.S. Cl.
CPC ........ *G02F 1/1323* (2013.01); *G02F 1/13345* (2021.01); *G02F 1/133531* (2021.01); *G02F 1/134309* (2013.01)

(58) Field of Classification Search
CPC ...... G02F 1/1323; G02F 1/133602–1/133614; G02B 6/0033–0063
See application file for complete search history.

(56) References Cited

U.S. PATENT DOCUMENTS

2010/0128200 A1* 5/2010 Morishita ........... G02F 1/13363
349/62
2019/0094593 A1* 3/2019 Hasegawa ........... G02F 1/13363
(Continued)

FOREIGN PATENT DOCUMENTS

CN 106444185 A 2/2017
CN 108169953 A 6/2018
(Continued)

OTHER PUBLICATIONS

International Search Report in International application No. PCT/CN2022/096921, mailed on Dec. 19, 2022.
(Continued)

Primary Examiner — Mariam Qureshi
(74) Attorney, Agent, or Firm — PV IP PC; Wei Te Chung

(57) ABSTRACT

A privacy film and a display device are provided. The privacy film includes a first polarizer, a first electrode layer, a dimming liquid crystal layer, a second electrode layer, and a second polarizer. The first polarizer, the first electrode layer, the dimming liquid crystal layer, the second electrode layer, and the second polarizer are stacked in sequence, so that multi-angle privacy protection can be achieved.

17 Claims, 7 Drawing Sheets

(51) Int. Cl.
*G02F 1/1335* (2006.01)
*G02F 1/1343* (2006.01)

(56) References Cited

U.S. PATENT DOCUMENTS

| | | | | |
|---|---|---|---|---|
| 2022/0236595 A1* | 7/2022 | Dong | ............. | G02F 1/1323 |
| 2023/0168528 A1* | 6/2023 | Xin | ............. | G02F 1/133531 |
| 2023/0213824 A1* | 7/2023 | Yang | ............. | G02F 1/1323 |
| | | | | 257/72 |

FOREIGN PATENT DOCUMENTS

| | | | |
|---|---|---|---|
| CN | 109298572 | A | 2/2019 |
| CN | 110187527 | A | 8/2019 |
| CN | 211478805 | U | 9/2020 |
| CN | 112162438 | A | 1/2021 |
| CN | 112198709 | A | 1/2021 |
| CN | 112987349 | A | 6/2021 |
| CN | 112987350 | A | 6/2021 |
| CN | 214174773 | U | 9/2021 |
| CN | 114019705 | A | 2/2022 |
| JP | 2003186017 | A | 7/2003 |
| JP | 2008102236 | A | 5/2008 |
| TW | I756820 | B | 3/2022 |

OTHER PUBLICATIONS

Written Opinion of the International Search Authority in International application No. PCT/CN2022/096921, mailed on Dec. 19, 2022.
Chinese Office Action issued in corresponding Chinese Patent Application No. 202210556455.6 dated Apr. 19, 2023, pp. 1-7.

* cited by examiner

PRIVACY FILM AND DISPLAY DEVICE

BACKGROUND OF INVENTION

1. Field of Invention

The present application relates to a technical field of displays, and particularly to a privacy film and a display device.

2. Related Art

With population and wide application of display devices, such as smartphones, laptops, tablets, etc., users have become concerned that other people can read sensitive or private information from the display devices. In public places, users pay more and more attention to the privacy of personal information, and the concept of privacy display devices has gradually attracted users' attention. Original privacy devices are configured to attach a layer of privacy film on outer surfaces of the display devices, which can make left and right black and invisible. However, this privacy film will reduce brightness of the display devices and cannot switch between a privacy mode and a non-privacy protection mode. Therefore, current switchable privacy display devices are generally equipped with dimming boxes on the basis of the current display devices to control the light in the left and right directions of the display devices, so as to achieve left and right two-way switchable privacy protection. However, current switchable privacy display devices can only achieve peep-proof effects in the left and right directions, but cannot provide privacy protection in the front, rear, left, and right directions at the same time.

SUMMARY OF INVENTION

An object of the present application is to provide a privacy film and a display device to achieve privacy protection in various directions.

In order to achieve the above-mentioned object, the present application provides a privacy film, including a first polarizer, a first electrode layer, a dimming liquid crystal layer, a second electrode layer, and a second polarizer. The first polarizer, the first electrode layer, the dimming liquid crystal layer, the second electrode layer, and the second polarizer are stacked in sequence.'

Specifically, the first electrode layer includes at least two first electrode plates spaced apart from each other, the second electrode layer includes at least a second electrode plate, and an orthographic projection of the second electrode plate on the first electrode layer falls between adjacent ones of the first electrode plates, wherein at least two electric fields in different directions are created between adjacent ones of the first electrode plate and the second electrode plate, and an optical axis direction of the first polarizer is parallel to an optical axis direction of the second polarizer.

Optionally, in some embodiments of the present application, the first electrode plate includes at least two first sub-electrode plates connected end to end in sequence, and adjoining ones of the first sub-electrode plates are disposed at an angle with respect to each other, wherein the second electrode plate includes at least two second sub-electrode plates connected end to end in sequence, and adjoining ones of the second sub-electrode plates are disposed at an angle with respect to each other.

Optionally, in some embodiments of the present application, the first sub-electrode plates arranged in odd-numbered segments are parallel to each other, and the second sub-electrode plates arranged in odd-numbered segments are parallel to each other.

Optionally, in some embodiments of the present application, the first sub-electrode plates arranged in even-numbered segments are parallel to each other, and the second sub-electrode plates arranged in even-numbered segments are parallel to each other.

Optionally, in some embodiments of the present application, the angle between the adjoining first sub-electrode plates is 90 degrees, and the angle between the adjoining second sub-electrode plates is 90 degrees.

Optionally, in some embodiments of the present application, the first electrode plate includes a first segment of the first sub-electrode plate and a second segment of the first sub-electrode plate, and the second electrode plate includes a first segment of the second sub-electrode plate and a second segment of the second sub-electrode plate.

Specifically, the first segment of the first sub-electrode plate is parallel to the first segment of the second sub-electrode plate, and the second segment of the first sub-electrode plate is parallel to the second segment of the second sub-electrode plate.

Optionally, in some embodiments of the present application, the first electrode plate further includes a third segment of the first sub-electrode plate connected to the second segment of the first sub-electrode plate, the second electrode plate further includes a third segment of the second sub-electrode plate connected to the second segment of the second sub-electrode plate, and the third segment of the first sub-electrode plate is parallel to the third segment of the second sub-electrode plate.

Optionally, in some embodiments of the present application, the first segment of the first sub-electrode plate is parallel to the third segment of the first sub-electrode plate.

Optionally, in some embodiments of the present application, the first segment of the first sub-electrode plate is not parallel to the third segment of the second sub-electrode plate.

Optionally, in some embodiments of the present application, in a first mode, an angle between a major axis of each of liquid crystal molecules in the dimming liquid crystal layer and a normal line of the first polarizer is $\alpha$, and $\alpha$ is greater than or equal to 85 degrees and less than or equal to 90 degrees, or $\alpha$ is greater than or equal to zero degrees and less than or equal to five degrees, wherein in a second mode, the major axes of the liquid crystal molecules in the dimming liquid crystal layer are tilted with respect to the normal line of the first polarizer in at least four directions.

Optionally, in some embodiments of the present application, in the second mode, an angle between the major axes of the liquid crystal molecules in the dimming liquid crystal layer and the normal line of the first polarizer is an acute angle.

Optionally, in some embodiments of the present application, the angle between the major axes of the liquid crystal molecules in the dimming liquid crystal layer and the normal line of the first polarizer ranges from 20 degrees to 40 degrees.

Optionally, in some embodiments of the present application, the dimming liquid crystal layer includes a polymer network and liquid crystal molecules distributed in the polymer network.

Correspondingly, the present application further provides a display device, including a privacy film and a display panel. Specifically, the privacy film includes a first polarizer, a first electrode layer, a dimming liquid crystal layer, a second electrode layer, and a second polarizer, wherein the first polarizer, the first electrode layer, the dimming liquid crystal layer, the second electrode layer, and the second polarizer are stacked in sequence.

Specifically, the first electrode layer includes at least two first electrode plates spaced apart from each other, the second electrode layer includes at least a second electrode plate, and an orthographic projection of the second electrode plate on the first electrode layer falls between adjacent ones of the first electrode plates, wherein at least two electric fields in different directions are created between adjacent ones of the first electrode plate and the second electrode plate, and an optical axis direction of the first polarizer is parallel to an optical axis direction of the second polarizer.

The display panel is disposed on a side of the first polarizer or the second polarizer away from the dimming liquid crystal layer.

Optionally, in some embodiments of the present application, the first electrode plate includes at least two first sub-electrode plates connected end to end in sequence, and adjoining ones of the first sub-electrode plates are disposed at an angle with respect to each other, wherein the second electrode plate includes at least two second sub-electrode plates connected end to end in sequence, and adjoining ones of the second sub-electrode plates are disposed at an angle with respect to each other.

Optionally, in some embodiments of the present application, the first electrode plate includes a first segment of the first sub-electrode plate and a second segment of the first sub-electrode plate, and the second electrode plate includes a first segment of the second sub-electrode plate and a second segment of the second sub-electrode plate.

Specifically, the first segment of the first sub-electrode plate is parallel to the first segment of the second sub-electrode plate, and the second segment of the first sub-electrode plate is parallel to the second segment of the second sub-electrode plate.

Optionally, in some embodiments of the present application, the first electrode plate further includes a third segment of the first sub-electrode plate connected to the second segment of the first sub-electrode plate, the second electrode plate further includes a third segment of the second sub-electrode plate connected to the second segment of the second sub-electrode plate, and the third segment of the first sub-electrode plate is parallel to the third segment of the second sub-electrode plate.

Optionally, in some embodiments of the present application, the first segment of the first sub-electrode plate is parallel to the third segment of the first sub-electrode plate.

Optionally, in some embodiments of the present application, the first segment of the first sub-electrode plate is not parallel to the third segment of the second sub-electrode plate.

Optionally, in some embodiments of the present application, the dimming liquid crystal layer includes a polymer network and liquid crystal molecules distributed in the polymer network.

The present application has advantageous effects as follows: the present application provides the privacy film and the display device. The privacy film includes the first polarizer, the first electrode layer, the dimming liquid crystal layer, the second electrode layer, and the second polarizer. The first polarizer, the first electrode layer, the dimming liquid crystal layer, the second electrode layer, and the second polarizer are stacked in sequence. Specifically, the first electrode layer includes at least two first electrode plates spaced apart from each other, the second electrode layer includes at least a second electrode plate, and the orthographic projection of the second electrode plate on the first electrode layer falls between adjacent ones of the first electrode plates. Specifically, at least two electric fields in different directions are created between adjacent ones of the first electrode plate and the second electrode plate, and an optical axis direction of the first polarizer is parallel to an optical axis direction of the second polarizer. In the present application, at least two electric fields in different directions are created between the adjacent ones of the first electrode plate and the second electrode plate, then the second electrode plate located between the adjacent first electrode plates and the first electrode plates collectively form at least four electric fields in different directions. The electric fields in the at least four different directions can make the major axes of the liquid crystal molecules in the dimming liquid crystal layer incline in at least four directions with respect to the normal of the first polarizer, thus achieving multi-angle privacy protection.

BRIEF DESCRIPTION OF DRAWINGS

In order to better illustrate the technical solutions in the embodiments of the present application, the following will briefly introduce the accompanying drawings that need to be used in the description of the embodiments. Apparently, the accompanying drawings in the following description show merely some embodiments of the present invention, and a person skilled in the art may still derive other drawings from these accompanying drawings without creative efforts.

DESCRIPTION OF PREFERRED EMBODIMENTS

Figure 1:
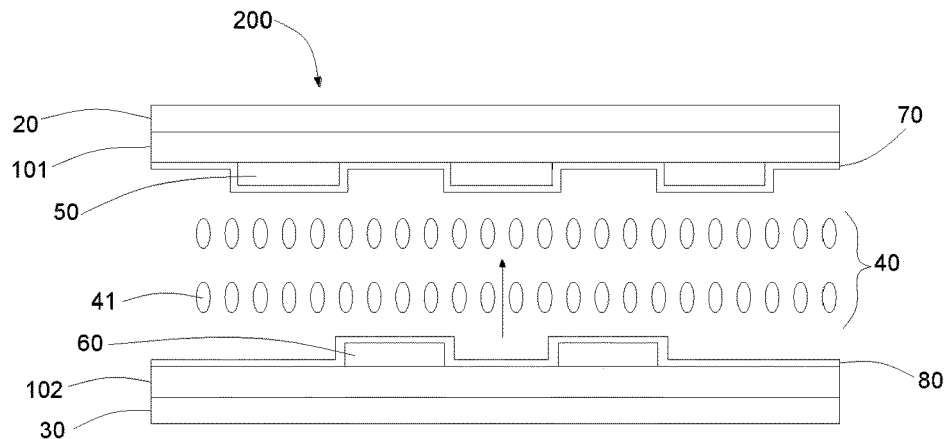
FIG. 1 is a schematic view of a first structure of a privacy film provided by the present application.

The technical solutions in the embodiments of the present application will be clearly and completely described below with reference to the drawings in the embodiments of the present application. Obviously, the described embodiments are only a part of the embodiments of the present application, rather than all the embodiments. Based on the embodiments in this application, all other embodiments obtained by those skilled in the art without creative efforts shall fall within the protection scope of this application.

In the description of the present application, it is to be understood that the term "upper", "lower", "front", "rear", "left", "right", "inner", "outer" indicates orientation or the orientation or positional relationship based on the positional relationship shown in the drawings, for convenience of description only and the present application is to simplify the description, but does not indicate or imply that the device or element referred to must have a particular orientation in a particular orientation construction and operation, and therefore not be construed as limiting the present application. In addition, the terms "first" and "second" are only used for descriptive purposes and are not to be construed as indicating or implying relative importance. Thus, features defining "first" or "second" may include one or more of the described features either explicitly or implicitly. In the description of the present invention, the meaning of "plurality" is two or more unless specifically and specifically defined otherwise.

The present application provides a display device, which will be described in detail below. It should be noted that the description order of the following embodiments is not intended to limit the preferred order of the embodiments of the present application.

Referring to FIG. 1, FIG. 1 is a schematic view of a first structure of a privacy film provided by the present application. An embodiment of the present application provides a privacy film 200, including a first polarizer 20, a first electrode layer 50, a dimming liquid crystal layer 40, a second electrode layer 60, and a second polarizer 30.

Specifically, the first polarizer 20, the first electrode layer 50, the dimming liquid crystal layer 40, the second electrode layer 60, and the second polarizer 30 are stacked in sequence.

In some embodiments, in a first mode, a major axis of each of liquid crystal molecules 41 in the dimming liquid crystal layer 40 is located at an angle α with respect to a normal line of the first polarizer 20. The angle α is greater than or equal to 85 degrees and less than or equal to 90 degrees, or the angle α is greater than or equal to zero degrees and less than or equal to five degrees. In a second mode, the major axes of the liquid crystal molecules 41 in the dimming liquid crystal layer 40 are tilted with respect to the normal line of the first polarizer 20 in at least four directions. An optical axis direction of the first polarizer 20 is parallel to an optical axis direction of the second polarizer 30.

Figure 2:
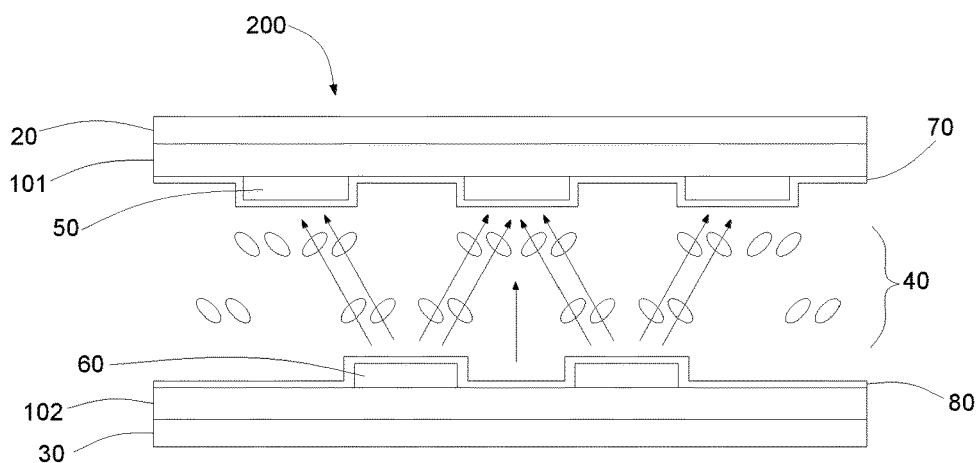
FIG. 2 is a schematic view of the privacy film of FIG. 1 in a second mode.
Figure 3:
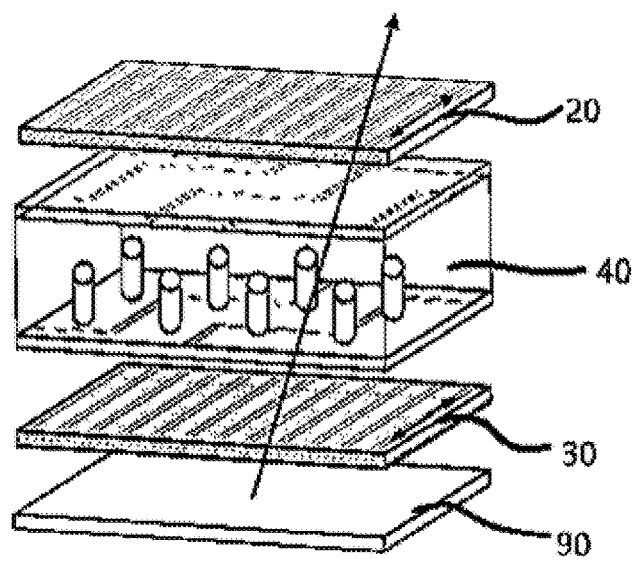
FIG. 3 is a schematic view of light viewed from a side direction of the privacy film in a first mode.
Figure 4:
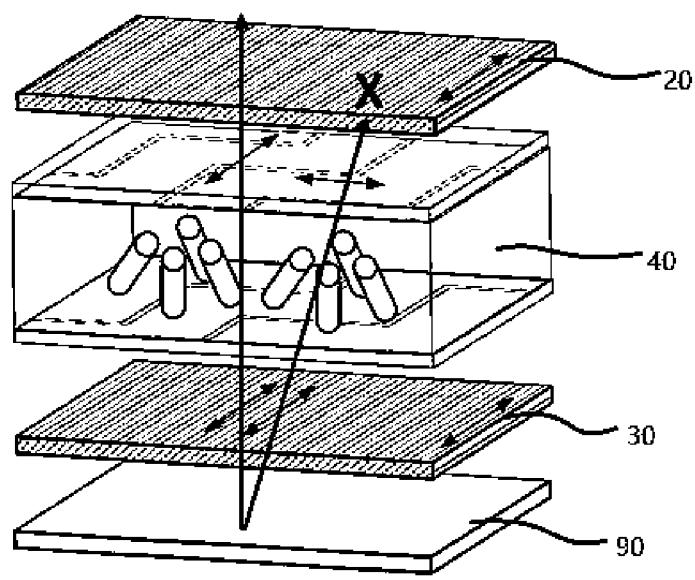
FIG. 4 is a schematic view of light viewed from a side direction and a face direction of the privacy film in the second mode.
Figure 5:
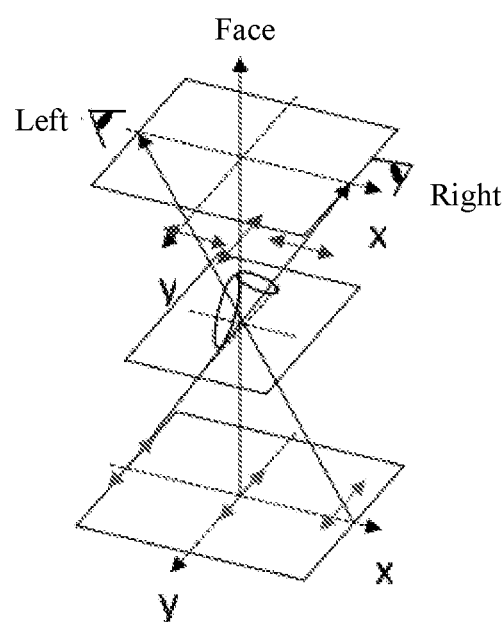
FIG. 5 is a schematic view of light viewed from a left direction, a right direction, and a face direction of the privacy film in the second mode.
Figure 6:
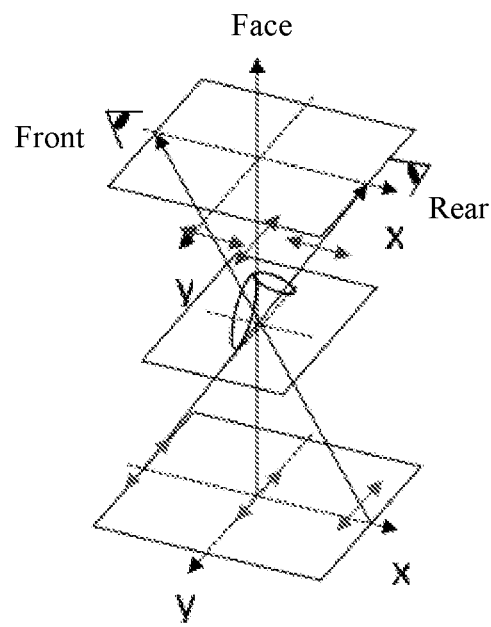
FIG. 6 is a schematic view of light viewed from a front direction, a rear direction, and a face direction of the privacy film in the second mode.

Please refer to FIGS. 1 to 6. FIG. 2 is a schematic view of the privacy film 200 of FIG. 1 in a second mode. FIG. 3 is a schematic view of light viewed from a side direction of the privacy film 200 in a first mode. FIG. 4 is a schematic view of light viewed from a side direction and a face direction of the privacy film 200 in the second mode. FIG. 5 is a schematic view of light viewed from a left direction, a right direction, and a face direction of the privacy film 200 in the second mode. FIG. 6 is a schematic view of light viewed from a front direction, a rear direction, and a face direction of the privacy film 200 in the second mode.

A light incident side may be the first polarizer 20 or the second polarizer 30. Specifically, in this embodiment, please refer to FIG. 3 or 4, a backlight light source 90 is set on a side of the second polarizer 30 away from the dimming liquid crystal layer 40. Referring to FIGS. 1 and 3, when the liquid crystal molecules 41 in the dimming liquid crystal layer 40 are negative liquid crystal molecules, in the first mode, the major axes of the liquid crystal molecules 41 in the dimming liquid crystal layer 40 is located at the angle α with respect to the normal line of the first polarizer 20. The angle α is greater than or equal to 85 degrees and less than or equal to 90 degrees, or, the angle α is greater than or equal to zero degrees and less than or equal to 5 degrees. As an optimal effect, the liquid crystal molecules 41 in the dimming liquid crystal layer 40 are in an initial vertical orientation and are arranged in a direction perpendicular or parallel to the normal line of the first polarizer 20. That is, the angle between the major axes of the liquid crystal molecules 41 in the dimming liquid crystal layer 40 and the normal line of the first polarizer 20 is 90 degrees or zero degrees. In this case, when the privacy film 200 is viewed from front, rear, left, right, and face directions of the privacy film 200, the polarized light passing through the second polarizer 30 is incident on the dimming liquid crystal layer 40 in a direction parallel to the major axis the liquid crystal molecules 41. A polarization direction of the polarized light does not change. The polarized light in the front, rear, left, right and face directions of the privacy film 200 passing through the first polarizer 20 will not be absorbed, no brightness lost occurs, and a wide viewing angle is presented, so that the privacy film 200 is in a shared state. Specifically, when the privacy film 200 is in the first mode, and the liquid crystal molecules 41 are negative liquid crystal molecules, the angle α is greater than or equal to 85 degrees and less than or equal to 90 degrees. When the liquid crystal molecules 41 are positive liquid crystal molecules, the angle α is greater than or equal to zero degrees and less than or equal to five degrees.

Referring to FIGS. 2 and 4 to 6, in the second mode, the angles of the liquid crystal molecules 41 in the dimming liquid crystal layer 40 are changed, so that the major axes of the liquid crystal molecules 41 in the dimming liquid crystal layer 40 are tilted with respect to the normal line of the first polarizer 20 in at least four directions. In a case that the major axes of the liquid crystal molecules 41 in the dimming liquid crystal layer 40 are tilted with respect to the normal of the first polarizer 20 in the front, rear, left, and right directions, respectively, the polarization directions of the polarized light viewed from the front, rear, left, and right directions of the privacy film 200 have an included angle with respect to the major axes of the liquid crystal molecules 41. The polarization directions of the polarized light viewed from the face direction of the privacy film 200 are parallel or perpendicular to the major axes of the liquid crystal molecules 41. Therefore, the polarized light in the front, rear, left, and right directions of the privacy film 200 will be absorbed through the first polarizer 20, thus resulting in brightness lost, while the polarized light in the face direction of the privacy film 200 will not be absorbed through the first polarizer 20, no brightness lost occurs, and the privacy film 200 exhibits a narrow viewing angle, that is, the privacy film 200 is in a privacy state.

In some embodiments, in the second mode, an angle between the major axes of the liquid crystal molecules 41 in the dimming liquid crystal layer 40 and the normal line of the first polarizer 20 is an acute angle. Specifically, in the second mode, the included angle between the major axes of the liquid crystal molecules 41 in the dimming liquid crystal layer 40 and the normal line of the first polarizer 20 ranges from 20 degrees to 40 degrees. In the second mode, when the polarized light viewed from the front, rear, left, and right directions of the privacy film 200 passes through the dimming liquid crystal layer 40, a polarization state will change, and the polarized light is partially absorbed when passing through the first polarizer 20, resulting in a decrease in the brightness. Particularly, when the included angle between the major axes of the liquid crystal molecules 41 in the dimming liquid crystal layer 40 and the normal line of the first polarizer 20 ranges from 20 degrees to 40 degrees, the polarized light viewed from the front, rear, left, and right directions of the privacy film 200 is absorbed to the maximum brightness when passing through the first polarizer 20. In addition, when a thickness of the dimming liquid crystal layer 40 is adjusted so that a phase difference between a light incident side and a light output side of the dimming liquid crystal layer 40 reaches $\pi$, the polarized light viewed from the front, rear, left, and right directions of the privacy film 200 will be deflected by 90 degrees after passing through the dimming liquid crystal layer 40 and will be fully absorbed by the first polarizer 20, so that the brightness of the polarized light viewed from the front, rear, left, and right directions of the privacy film 200 is the lowest, showing an excellent narrow viewing angle. Specifically, the phase difference between the light incident side and the light output side of the dimming liquid crystal layer 40 is obtained according to characteristics of the liquid crystal. The phase difference between the light incident side and the light output side of the dimming liquid crystal layer 40 is equal to $2\pi\Delta nd/\lambda$, wherein $\lambda$ is a wavelength of a light wave, d is a distance that the light travels in the dimming liquid crystal layer 40 in the viewing direction, $\Delta nd$ is displacement of a point on the light wave in a propagation direction of the wave. By changing the thickness of the liquid crystal layer, d can be changed, so that $2\pi\Delta nd/\lambda$ is equal to $\pi$.

Figure 7:
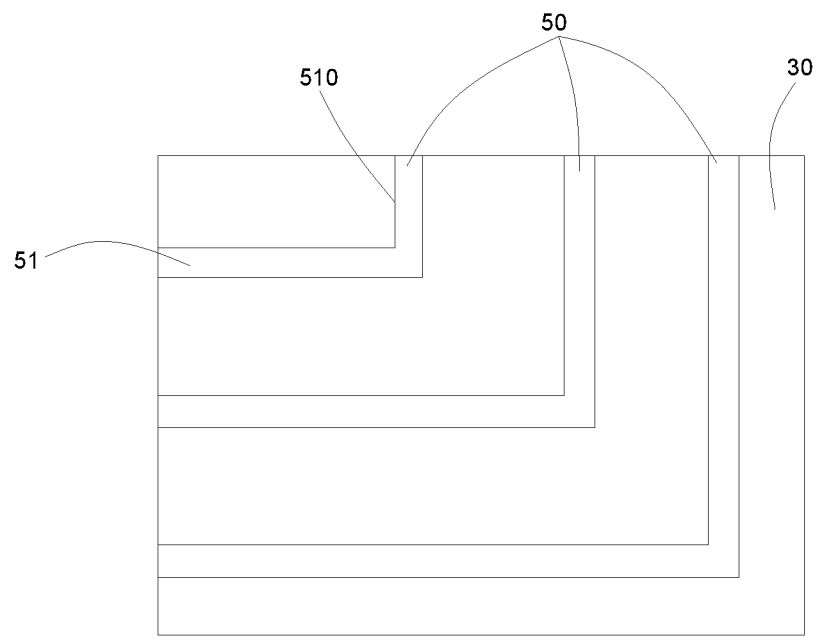
FIG. 7 is a schematic view of an orthographic projection of a first structure of a first electrode layer of the privacy film of the present application on a first polarizer.
Figure 8:
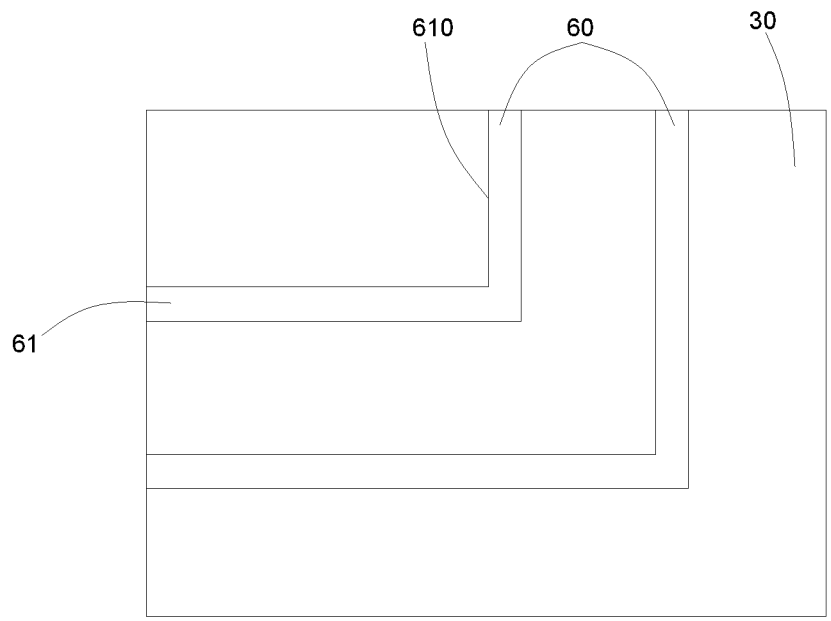
FIG. 8 is a schematic view of an orthographic projection of a first structure of a second electrode layer of the privacy film of the present application on the first polarizer.
Figure 9:
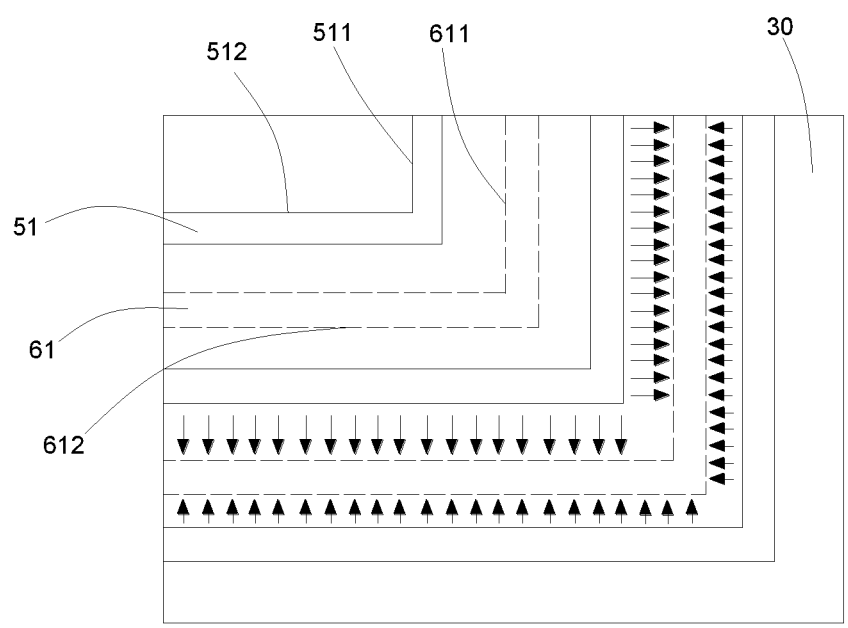
FIG. 9 is a schematic view of the orthographic projections of the first structures of the first electrode layer and the second electrode layer of the privacy film of the present application on the first polarizer.

Please refer to FIGS. 7 to 9. FIG. 7 is a schematic view of an orthographic projection of a first structure of the first electrode layer of the privacy film 200 of the present application on the first polarizer. FIG. 8 is a schematic view of an orthographic projection of a first structure of a second electrode layer of the privacy film 200 of the present application on the first polarizer. FIG. 9 is a schematic view of the orthographic projections of the first structures of the first electrode layer and the second electrode layer of the privacy film 200 of the present application on the first polarizer. In some embodiments, the first electrode layer 50 includes at least two first electrode plates 51 spaced apart from each other, the second electrode layer 60 includes at least a second electrode plate 61. An orthographic projection of the second electrode plate 61 on the first electrode layer 50 falls between adjacent ones of the first electrode plates 51. At least two electric fields in different directions are created between the adjacent ones of the first electrode plate 51 and the second electrode plate 61.

At least four electric fields in different directions are created between the first electrode layer 50 and the second electrode layer 60. The electric field in each direction causes some of the liquid crystal molecules 41 in the dimming liquid crystal layer 40 to be tilted in one direction with respect to the normal line of the first polarizer 20.

That is, by forming at least four electric fields in different directions between the first electrode layer 50 and the second electrode layer 60, the electric fields in at least four different directions make the liquid crystal molecules 41 in the dimming liquid crystal layer 40 incline in at least four different directions with respect to the normal of the first polarizer 20. Specifically, the electric fields in at least four different directions make the liquid crystal molecules 41 in the dimming liquid crystal layer 40 incline at least in the front, rear, left, and right directions with respect to the normal of the first polarizer 20.

Referring to FIG. 9, that is to say, the first electrode layer 50 includes at least two first electrode plates 51, then there are two first electrode plates 51 in the first electrode layer 50 located adjacent to a same second electrode plate 61, and at least two electric fields in different directions are created between the adjacent first electrode plate 51 and the second electrode plate 61. Therefore, at least four electric fields in different directions are created between the first electrode layer 50 and the second electrode layer 60. FIG. 9 includes four arrow directions, and the four arrow directions represent the front direction, the rear direction, the left direction, and the right direction of the liquid crystal molecules 41, respectively, in the dimming liquid crystal layer 40 tilted relative to the normal line of the first polarizer 20. It can be seen from FIG. 9 that four electric fields in different directions are created between the first electrode layer 50 and the second electrode layer 60.

Specifically, the first electrode plate 51 includes at least two first sub-electrode plates 510 connected end to end in sequence, and adjoining ones of the first sub-electrode plates 510 are disposed at an angle with respect to each other. The second electrode plate 61 includes at least two second sub-electrode plates 610 connected end to end in sequence, and adjoining ones of the second sub-electrode plates 610 are disposed at an angle with respect to each other.

Each of the first sub-electrode plates 510 and each of the second sub-electrode plates 610 are located in a one-to-one correspondence to form a pair of electrodes. The first electrode plate 51 and the second electrode plate 61 form at least two pairs of electrodes, and a directional electric field is created between the first sub-electrode plate 510 and the second sub-electrode plate 610 of each pair of the electrodes. In addition, since there is an included angle formed between the adjoining first sub-electrode plates 510 and an included angle between the adjoining second sub-electrode plates 610, at least two electric fields in different directions are created between at least two pairs of the electrodes.

Figure 10:
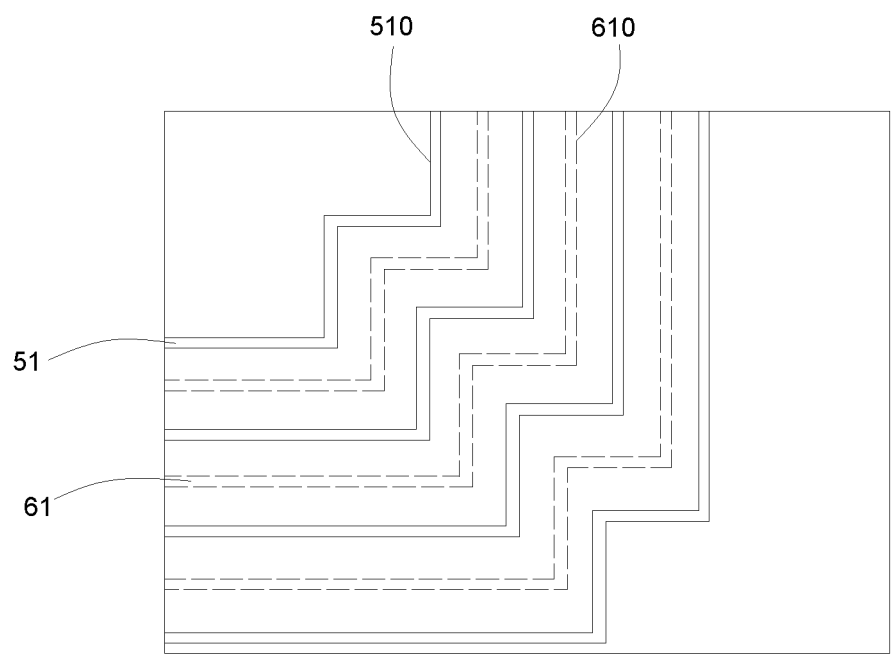
FIG. 10 is a schematic view of orthographic projections of second structures of the first electrode layer and the second electrode layer of the privacy film of the present application on the first polarizer.

Referring to FIG. 10, FIG. 10 is a schematic view of orthographic projections of second structures of the first electrode layer and the second electrode layer of the privacy film 200 of the present application on the first polarizer. Further, the first sub-electrode plates 510 arranged in odd-numbered segments are parallel to each other, and the second sub-electrode plates 610 arranged in odd-numbered segments are parallel to each other. Since the first sub-electrode plates 510 and the second sub-electrode plates 610 are in a one-to-one correspondence and form pairs of electrodes, respectively, a pair of electrodes is formed between the first sub-electrode plate 510 in the odd-numbered segment and the second sub-electrode plate 610 in the odd-numbered segment. By setting the odd-numbered first sub-electrode plates 510 to be parallel to each other, and the odd-numbered second sub-electrode plates 610 to be parallel to each other, directions of the electric fields created between the plurality of pairs of the first sub-electrode plates 510 and the second sub-electrode plates 610 in odd-numbered segments can be the same, which can increase an area of an electric field in a certain direction, so that more liquid crystal molecules 41 in the dimming liquid crystal layer 40 can be tilted in one direction with respect to the normal line of the first polarizer 20, thereby making the brightness of the polarized light viewed from a certain side of the privacy film 200 lower, and providing better privacy protection. For example, the first electrode plate 51 includes four first sub-electrode plates 510 connected end-to-end in sequence, and the second electrode plate 61 includes four second sub-electrode plates 610 connected end-to-end in sequence. Then, the first segment of the first sub-electrode plate 511 is parallel to the third segment of the first sub-electrode plate 513, and the first segment of the second sub-electrode plate 611 is parallel to the third segment of the second sub-electrode plate 613.

Still further, the first sub-electrode plates 510 in even-numbered segments are parallel to each other, and the second sub-electrode plates 610 arranged in even-numbered segments are parallel to each other. Since the first sub-electrode plates 510 and the second sub-electrode plates 610 are in a one-to-one correspondence and form pairs of electrodes, respectively, a pair of electrodes is formed between the first sub-electrode plate 510 in the even-numbered segment and the second sub-electrode plate 610 in the even-numbered segment. By setting the even-numbered first sub-electrode plates 510 to be parallel to each other, and the even-numbered second sub-electrode plates 610 to be parallel to each other, directions of the electric fields created between the plurality of pairs of the first sub-electrode plates 510 and the second sub-electrode plates 610 in even-numbered segments can be the same, which can increase an area of an electric field in a certain direction, so that more liquid crystal molecules 41 in the dimming liquid crystal layer 40 can be tilted in one direction with respect to the normal line of the first polarizer 20, thereby making the brightness of the polarized light viewed from a certain side of the privacy film 200 lower, and providing better privacy protection. For example, the first electrode plate 51 includes four first sub-electrode plates 510 connected end-to-end in sequence, and the second electrode plate 61 includes four second sub-electrode plates 610 connected end-to-end in sequence. Then, the second segment of the first sub-electrode plate 512 is parallel to the fourth segment of the first sub-electrode plate 510, and the second segment of the second sub-electrode plate 612 is parallel to the fourth segment of the second sub-electrode plate 610.

Specifically, the included angle between adjoining first sub-electrode plates 510 is 90 degrees, and the included angle between adjoining second sub-electrode plates 610 is 90 degrees. The first sub-electrode plates 510 and the second sub-electrode plates 610 are in a one-to-one correspondence and form pairs of electrodes, respectively. The first electrode plate 51 and the second electrode plate 61 form at least two pairs of electrodes, and a directional electric field is created between the first sub-electrode plate 510 and the second sub-electrode plate 610 of each pair of the electrodes. In addition, two electric fields whose directions are perpendicular to each other are formed by adjacent pair of the electrodes. The two electric fields whose directions are perpendicular to each other make the liquid crystal molecules 41 in the dimming liquid crystal layer 40 inclined in two mutually perpendicular directions relative to the normal line of the first polarizer 20.

Please refer to FIGS. 7 to 9. Specifically, the first electrode plate 51 includes a first segment of the first sub-electrode plate 511 and a second segment of the first sub-electrode plate 512 that are connected to each other, and the second electrode plate 61 includes a first segment of the second sub-electrode plate 611 and a second segment of the second sub-electrode plate 612 that are connected to each other.

Specifically, the first segment of the first sub-electrode plate 511 is parallel to the first segment of the second sub-electrode plate 611, and the second segment of the first sub-electrode plate 512 is parallel to the second segment of the second sub-electrode plate 612. Further, the first segment of the first sub-electrode plate 511 is perpendicular to the second segment of the first sub-electrode plate 512, and the first segment of the second sub-electrode plate 611 is perpendicular to the second section of the second sub-electrode plate 612. An electric field in a first direction is formed between the first segment of the first sub-electrode plate 511 and the first segment of the second sub-electrode plate 611. An electric field in a second direction is formed between the second segment of the first sub-electrode plate 512 and the second segment of the second sub-electrode plate 612.

At least two electric fields in different directions are formed between the adjacent first electrode plate 51 and the second electrode plate 61. That is, an electric field in the first direction is formed between the first segment of the first sub-electrode plate 511 and the first segment of the second sub-electrode plate 611, and an electric field in the second direction is formed between the second segment of the first sub-electrode plate 512 and the second segment of the second sub-electrode plate 612. The first electrode layer 50 includes at least two first electrode plates 51, then there are two first electrode plates 51 in the first electrode layer 50 located adjacent to a same second electrode plate 61, so that four electric fields in different directions are created between the first electrode layer 50 and the second electrode layer 60. FIG. 9 includes four arrow directions, and the four arrow directions represent the front direction, the rear direction, the left direction, and the right direction of the liquid crystal molecules 41, respectively, in the dimming liquid crystal layer 40 tilted relative to the normal line of the first polarizer 20. It can be seen from FIG. 9 that four electric fields in different directions are created between the first electrode layer 50 and the second electrode layer 60.

Figure 11:
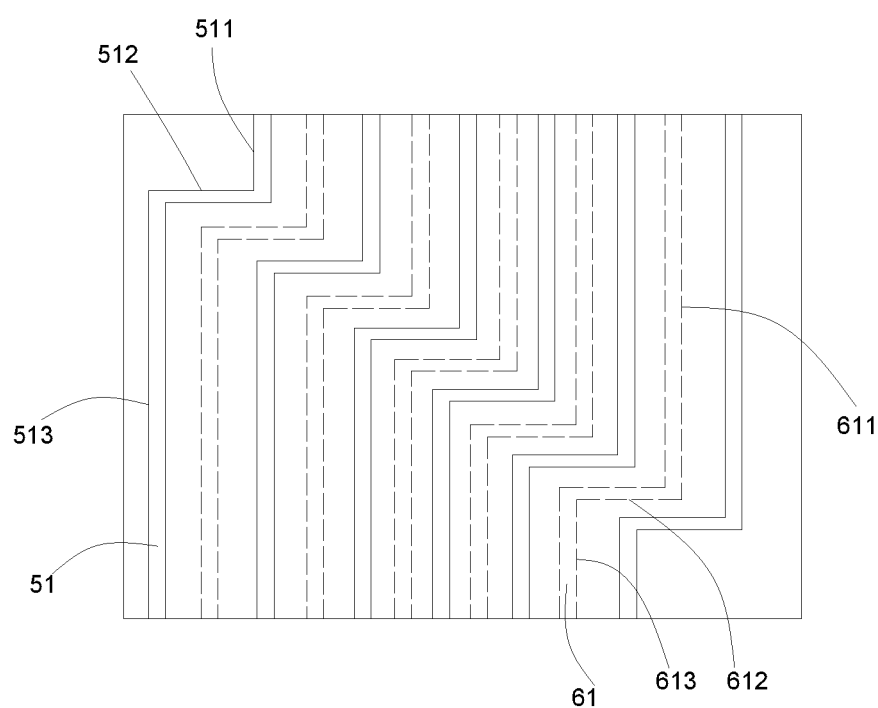
FIG. 11 is a schematic view of orthographic projections of third structures of the first electrode layer and the second electrode layer of the privacy film of the present application on the first polarizer.

Referring to FIG. 11, FIG. 11 is a schematic view of orthographic projections of third structures of the first electrode layer and the second electrode layer of the privacy film 200 of the present application on the first polarizer. The first electrode plate 51 includes a first segment of the first sub-electrode plate 511, a second segment of the first sub-electrode plate 512, and a third segment of the first sub-electrode plate 513 that are connected in sequence. The second electrode plate 61 includes a first segment of the second sub-electrode plate 611, a second segment of the second sub-electrode plate 612, and a third-segment of the second sub-electrode plate 613 that are connected in sequence.

In some embodiments, the first segment of the first sub-electrode plate 511, the first segment of the second sub-electrode plate 611, the third segment of the first sub-electrode plate 513, and the third segment of the second sub-electrode plate 613 are parallel to one another. That is, an electric field in a first direction is formed between the first segment of the first sub-electrode plate 511 and the first segment of the second sub-electrode plate 611. An electric field in a second direction is formed between the second segment of the first sub-electrode plate 512 and the second segment of the second sub-electrode plate 612. An electric field in a third direction is formed between the third segment of the first sub-electrode plate 513 and the third segment of the second sub-electrode plate 613.

By setting the third segment of the first sub-electrode plate 513 and the third segment of the second sub-electrode plate 613 and creating the electric field in the first direction between the third segment of the first sub-electrode plate 513 and the third segment of the second sub-electrode plate 613, directions of the electric fields created between two pairs of the first sub-electrode plates 510 and the second sub-electrode plate 610 can be the same, which can increase an area of an electric field in a certain direction, so that more liquid crystal molecules 41 in the dimming liquid crystal layer 40 can be tilted in one direction with respect to the normal line of the first polarizer 20, thereby making the brightness of the polarized light viewed from a certain side of the privacy film 200 lower, and providing better privacy protection.

Figure 12:
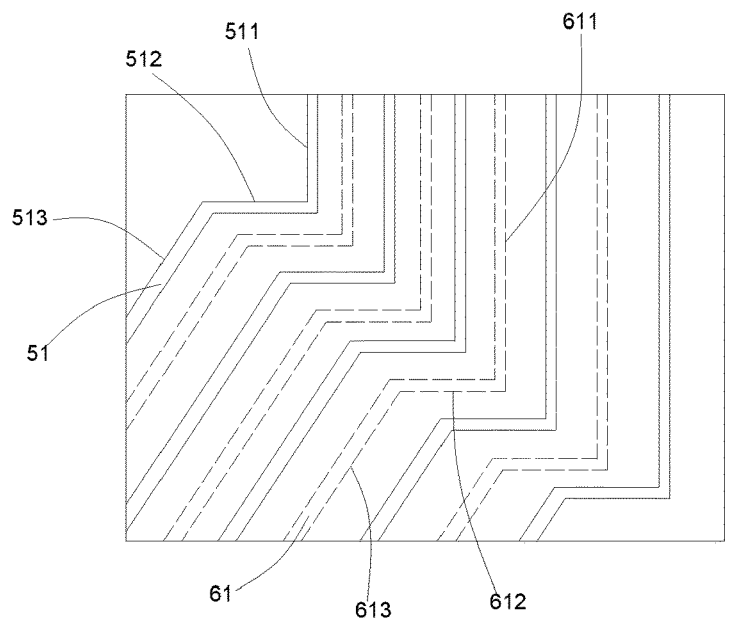
FIG. 12 is a schematic view of orthographic projections of fourth structures of the first electrode layer and the second electrode layer of the privacy film of the present application on the first polarizer.

Referring to FIG. 12, FIG. 12 is a schematic view of orthographic projections of fourth structures of the first electrode layer and the second electrode layer of the privacy film 200 of the present application on the first polarizer. The first electrode plate 51 includes a first segment of the first sub-electrode plate 511, a second segment of the first sub-electrode plate 512, and a third segment of the first sub-electrode plate 513 that are connected in sequence. The second electrode plate 61 includes a first segment of the second sub-electrode plate 611, a second segment of the second sub-electrode plate 612, and a third-segment of the second sub-electrode plate 613 that are connected in sequence. The first segment of the first sub-electrode plate 511 is parallel to the first segment of the second sub-electrode plate 611, the third segment of the first sub-electrode plate 513 is parallel to the third segment of the second sub-electrode plate 613, and the first segment of the first sub-electrode plate 511 is not parallel to the third segment of the first sub-electrode plate 513. That is, an electric field in the first direction is formed between the first segment of the first sub-electrode plate 511 and the first segment of the second sub-electrode plate 611. An electric field in the second direction is formed between the second segment of the first sub-electrode plate 512 and the second segment of the second sub-electrode plate 612. An electric field in the third direction is formed between the third segment of the first sub-electrode plate 513 and the third segment of the second sub-electrode plate 613.

At least two electric fields in different directions are formed between the adjacent first electrode plate 51 and the second electrode plate 61. That is, the electric field in the first direction is formed between the first segment of the first sub-electrode plate 511 and the first segment of the second sub-electrode plate 611, the electric field in the second direction is formed between the second segment of the first sub-electrode plate 512 and the second segment of the second sub-electrode plate 612, and the electric field in the third second direction is formed between the third segment of the first sub-electrode plate 513 and the third segment of the second sub-electrode plate 613. The first electrode layer 50 includes at least two first electrode plates 51, then there are two first electrode plates 51 in the first electrode layer 50 located adjacent to a same second electrode plate 61, so that six electric fields in different directions are created between the first electrode layer 50 and the second electrode layer 60.

Figure 13:
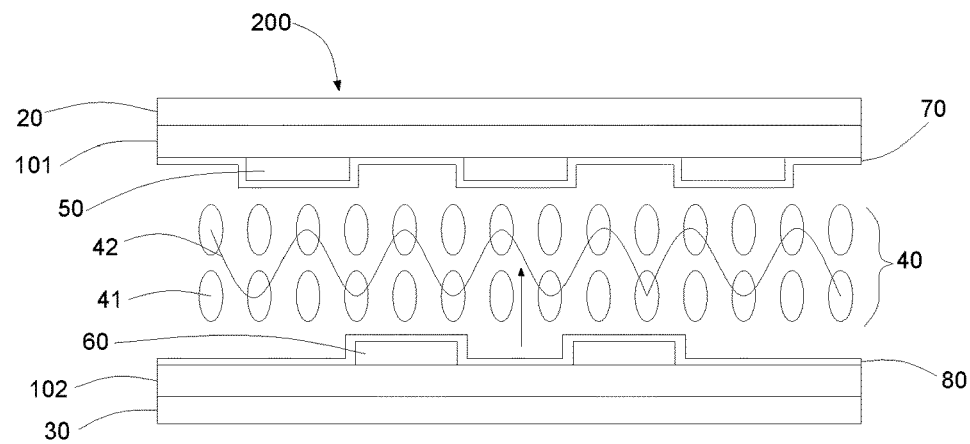
FIG. 13 is a schematic view of a second structure of the privacy film of the present application.
Figure 14:
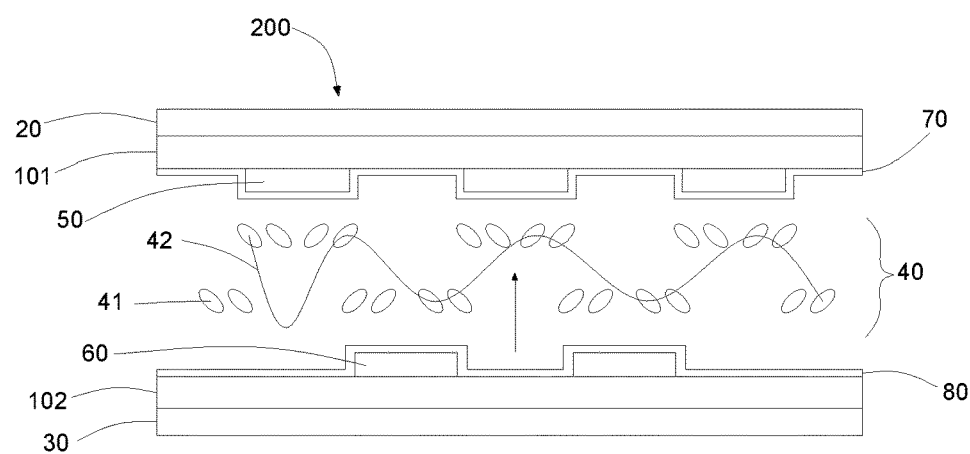
FIG. 14 is a schematic view of the second structure of the privacy film of the present application in the second mode.
Figure 15:
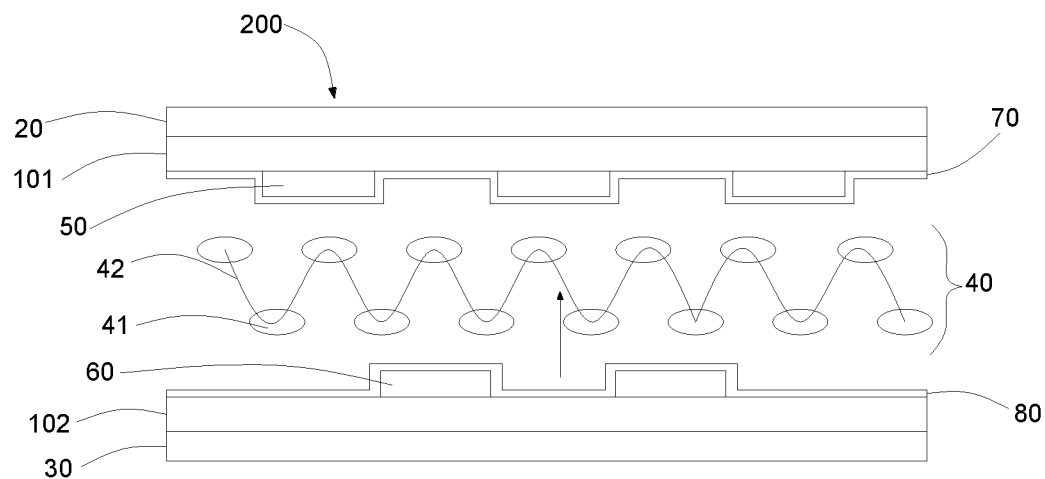
FIG. 15 is a schematic view of the second structure of the privacy film of the present application in the first mode.

Please refer to FIGS. 13 to 15. FIG. 13 is a schematic view of a second structure of the privacy film 200 of the present application. FIG. 14 is a schematic view of the second structure of the privacy film 200 of the present application in the second mode. FIG. 15 is a schematic view of the second structure of the privacy film 200 of the present application in the first mode. The dimming liquid crystal layer 40 includes a polymer network 42 and liquid crystal molecules 41 distributed in the polymer network 42. When the liquid crystal molecules 41 are pre-aligned, by energizing the second electrode layer 60 and the first electrode layer 50, the liquid crystal molecules 41 are inclined to a set angle. Then, the polymer in the dimming liquid crystal layer 40 is cured by means such as ultraviolet light to form the polymer network 42. After the electric field is removed, the polymer network 42 will maintain the liquid crystal molecules 41 tilted at the set angle. In the above situation, an optimal set angle can be selected according to actual needs, and then the polymer network 42 is configured to make the liquid crystal molecules 41 tilt at the set angle. Specifically, the angle can be set as follows: when the included angle between the major axes of the liquid crystal molecules 41 in the dimming liquid crystal layer 40 and the normal of the first polarizer 20 ranges from 20 degrees to 40 degrees, the privacy film 200 is in the second mode, and the major axes of the liquid crystal molecules 41 in the dimming liquid crystal layer 40 are inclined in at least four directions with respect to the normal of the first polarizer 20, that is, when the power is not turned on, the privacy film 200 is in the privacy state. When the privacy film 200 is in the first mode, by energizing the second electrode layer 60 and the first electrode layer 50, the major axis of each of the liquid crystal molecules 41 in the dimming liquid crystal layer 40 is located at the angle α with respect to the normal line of the first polarizer 20. The angle α is greater than or equal to 85 degrees and less than or equal to 90 degrees, or the angle α is greater than or equal to zero degrees and less than or equal to five degrees. As an optimal effect, the major axes of the liquid crystal molecules 41 in the dimming liquid crystal layer 40 are arranged in a direction perpendicular or parallel to the normal line of the first polarizer 20, that is, the angle between the major axes of the liquid crystal molecules 41 in the dimming liquid crystal layer 40 and the normal line of the first polarizer 20 is 90 degrees or zero degrees. Specifically, in this embodiment, when the privacy film 200 is in the first mode and the liquid crystal molecules 41 are negative liquid crystal molecules, the angle α is greater than or equal to zero degrees and less than or equal to five degrees. When the liquid crystal molecules 41 are positive liquid crystal molecules, the angle α is greater than or equal to 85 degrees and less than or equal to 90 degrees.

In some embodiments, the privacy film 200 further includes:
- a first alignment layer 70 disposed on a side of the first electrode layer 50 close to the second electrode layer 60; and
- a second alignment layer 80 disposed on a side of the second electrode layer 60 close to the first electrode layer 50.

The liquid crystal molecules 41 are pre-aligned by the first alignment layer 70 and the second alignment layer 80, wherein the first alignment layer 70 and the second alignment layer 80 include polyimide alignment films.

In some embodiments, the privacy film 200 further includes:
- a first substrate 101 disposed on a side of the first electrode layer 50 away from the second electrode layer 60; and
- a second substrate 102 disposed on a side of the second electrode layer 60 away from the first electrode layer 50.

The first electrode layer 50 and the second electrode layer 60 are supported by the first substrate 101 and the second substrate 102. Specifically, materials of the first substrate 101 and the second substrate 102 may be glass, polyester resin, transparent polyimide, ultra-thin glass, and other materials.

Figure 16:
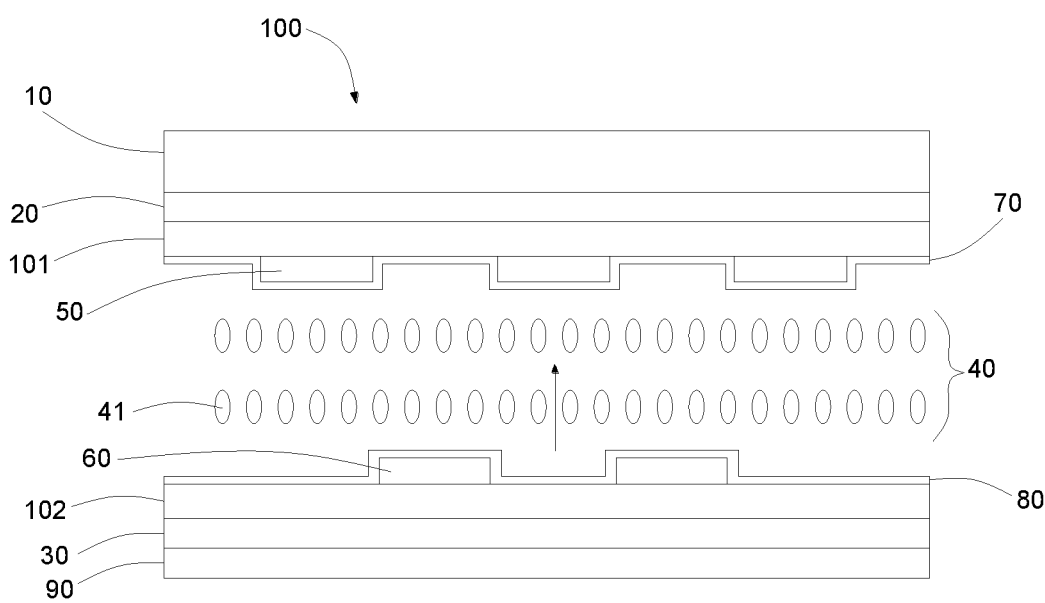
FIG. 16 is a schematic view of a display device of the present application.

Please refer to FIG. 16, which is a schematic view of a display device of the present application. An embodiment of the present application further provides a display device 100, which includes the privacy film 200 described above and a display panel 10, and the display panel 10 is disposed on a side of the first polarizer 20 or the second polarizer 30 away from the dimming liquid crystal layer 40. In this embodiment, the display panel 10 is disposed on the side of the first polarizer 20 away from the dimming liquid crystal layer 40.

A problem-solving principle of the display device 100 is similar to that of the aforementioned privacy film 200, so the implementation and beneficial effects of the display device 100 can be referred to the description of the aforementioned privacy film 200, and the repetition is not repeated here.

The display device 100 further includes a backlight light source 90, and the backlight light source 90 is a collimated light source. The collimated light source has a better display effect, which is beneficial to reduce the loss of the light source during the propagation process.

The light incident side may be the first polarizer 20 or the second polarizer 30. In some embodiments, the backlight light source 90 is disposed on a side of the second polarizer 30 away from the dimming liquid crystal layer 40. That is, in this embodiment, a side where the second polarizer 30 is located is the light incident side.

The above describes in detail the display device provided in the embodiments of the present application. Specific examples are used in this article to illustrate the principles and implementation of the application, and the descriptions of the above examples are only used to help understand the methods and core ideas of the application; In addition, for those skilled in the art, according to the idea of the application, there will be changes in the specific implementation and the scope of application. In summary, the content of this specification should not be construed as a limitation of the application.

What is claimed is:

1. A privacy film, comprising:
   a first polarizer;
   a first electrode layer;
   a dimming liquid crystal layer;
   a second electrode layer; and
   a second polarizer,
   wherein the first polarizer, the first electrode layer, the dimming liquid crystal layer, the second electrode layer, and the second polarizer are stacked in sequence in a vertical direction parallel with an upper surface of the first polarizer;
   wherein the first electrode layer comprises at least two first electrode plates spaced apart from each other, the second electrode layer comprises at least one second electrode plate, and an orthographic projection of the second electrode plate on the first electrode layer falls between two adjacent ones of the first electrode plates in a plan view of the privacy film perpendicular with the vertical direction, wherein the at least one second electrode plate has a same bent shape as that of the at least two first electrode plates and the bent shape of the at least one second electrode plate has a same orientation as that of the at least two first electrode plates in the plan view;
   wherein each of the first electrode plates comprises first sub-electrode plates connected end to end in sequence and a first angle is formed between every two connected ones of the first sub-electrode plates in the plan view, and the second electrode plate comprises second sub-electrode plates connected end to end in sequence and a second angle is formed between every two connected ones of the second sub-electrode plates in the plan view, to enable electrical fields created between each of the second sub-electrode plates and one or more of the first sub-electrode plates of respective ones of the first electrode plates adjacent and parallel with the second sub-electrode plate and formed respectively in at least four different directions, and wherein the first angle and the second angle is greater than zero and less than 180°;
   wherein the first sub-electrode plates include a first first sub-electrode plate and a second first sub-electrode plate connected in series, the first angle is formed between the first first sub-electrode plate and the second first sub-electrode plate, the second sub-electrode plates include a first second sub-electrode plate and a second second sub-electrode plate connected in series, and the second angle is formed between the first second sub-electrode plate and the second second sub-electrode plate;
   wherein the first first sub-electrode plate is parallel to the first second sub-electrode plate, and the second first sub-electrode plate is parallel to the second second sub-electrode plate; and
   wherein an optical axis direction of the first polarizer is parallel to an optical axis direction of the second polarizer.

2. The privacy film of claim 1, wherein odd-numbered ones of the first sub-electrode plates are parallel to each other, and odd-numbered ones of the second sub-electrode plates are parallel to each other.

3. The privacy film of claim 1, wherein even-numbered ones of the first sub-electrode plates are parallel to each other, and even-numbered ones of the second sub-electrode plates are parallel to each other.

4. The privacy film of claim 1, wherein the first angle is 90 degrees, and the second angle is 90 degrees.

5. The privacy film of claim 1, wherein the first sub-electrode plates further comprise a third first sub-electrode plate connected to the second first sub-electrode plate, the second sub-electrode plates further comprise a third second sub-electrode plate connected to the second second sub-electrode plate, and the third first sub-electrode plate is parallel to the third second sub-electrode plate.

6. The privacy film of claim 5, wherein the first first sub-electrode plate is parallel to the third first sub-electrode plate.

7. The privacy film of claim 5, wherein the first first sub-electrode plate is not parallel to the third first sub-electrode plate.

8. The privacy film of claim 1, wherein in a first mode, an angle α is formed between a major axis of each of liquid crystal molecules in the dimming liquid crystal layer and a normal line of the first polarizer, and α is greater than or equal to 85 degrees and less than or equal to 90 degrees, or α is greater than or equal to zero degrees and less than or equal to five degrees; and in a second mode, the major axis of each of the liquid crystal molecules in the dimming liquid crystal layer is tilted with respect to the normal line of the first polarizer in one of at least four directions.

9. The privacy film of claim 8, wherein in the second mode, major axes of the liquid crystal molecules in the dimming liquid crystal layer are tilted with respect to the normal line of the first polarizer in front, rear, left, and right directions, respectively.

10. The privacy film of claim 8, wherein in the second mode, an acute angle is formed between the major axis of each of the liquid crystal molecules in the dimming liquid crystal layer and the normal line of the first polarizer.

11. The privacy film of claim 10, wherein the acute angle ranges from 20 degrees to 40 degrees in the second mode.

12. The privacy film of claim 1, wherein the dimming liquid crystal layer comprises a polymer network and liquid crystal molecules distributed in the polymer network.

13. A display device, comprising:
a privacy film; and
a display panel;
wherein the privacy film comprises:
a first polarizer;
a first electrode layer;
a dimming liquid crystal layer;
a second electrode layer; and
a second polarizer,
wherein the first polarizer, the first electrode layer, the dimming liquid crystal layer, the second electrode layer, and the second polarizer are stacked in sequence in a vertical direction parallel with an upper surface of the first polarizer;
wherein the first electrode layer comprises at least two first electrode plates spaced apart from each other, the second electrode layer comprises at least one second electrode plate, and an orthographic projection of the second electrode plate on the first electrode layer falls between two adjacent ones of the first electrode plates in a plan view of the privacy film perpendicular with the vertical direction, wherein the at least one second electrode plate has a same bent shape as that of the at least two first electrode plates and the bent shape of the at least one second electrode plate has a same orientation as that of the at least two first electrode plates in the plan view;
wherein each of the first electrode plates comprises first sub-electrode plates connected end to end in sequence and a first angle is formed between every two connected ones of the first sub-electrode plates in the plan view, and the second electrode plate comprises second sub-electrode plates connected end to end in sequence and a second angle is formed between every two connected ones of the second sub-electrode plates in the plan view, to enable electrical fields created between each of the second sub-electrode plates and one or more of the first sub-electrode plates adjacent and parallel with the second sub-electrode plate and formed respectively in at least four different directions, and wherein the first angle and the second angle is greater than zero and less than 180°;
wherein the first sub-electrode plates include a first first sub-electrode plate and a second first sub-electrode plate connected in series, the first angle is formed between the first first sub-electrode plate and the second first sub-electrode plate, the second sub-electrode plates include a first second sub-electrode plate and a second second sub-electrode plate connected in series, and the second angle is formed between the first second sub-electrode plate and the second second sub-electrode plate;
wherein the first first sub-electrode plate is parallel to the first second sub-electrode plate, and the second first sub-electrode plate is parallel to the second second sub-electrode plate;
wherein an optical axis direction of the first polarizer is parallel to an optical axis direction of the second polarizer; and
wherein the display panel is disposed on a side of the first polarizer or the second polarizer away from the dimming liquid crystal layer.

14. The display device of claim 13, wherein the first sub-electrode plates further comprise a third first sub-electrode plate connected to the second first sub-electrode plate, the second sub-electrode plates further comprise a third second sub-electrode plate connected to the second second sub-electrode plate, and the third first sub-electrode plate is parallel to the third second sub-electrode plate.

15. The display device of claim 14, wherein the first first sub-electrode plate is parallel to the third first sub-electrode plate.

16. The display device of claim 14, wherein the first first sub-electrode plate is not parallel to the third first sub-electrode plate.

17. The display device of claim 13, wherein the dimming liquid crystal layer comprises a polymer network and liquid crystal molecules distributed in the polymer network.

* * * * *